United States Patent Office 2,980,719
Patented Apr. 18, 1961

2,980,719
REACTION OF TITANIUM ESTERS WITH ACID ANHYDRIDES

John H. Haslam, Landenberg, Pa., assignor to E. I. du Pont de Nemours and Company, Wilmington, Del., a corporation of Delaware No Drawing. Filed June 13, 1957, Ser. No. 665,608

15 Claims. (Cl. 260—429.5)

This invention relates to a process for the reaction of titanium esters with organic acid anhydrides. It also relates to new and useful polymeric titanium compounds.

Titanium ortho esters and polymerized titanium esters are well known materials, and there are numerous publications and patents concerning them. For example, my U.S. Patent 2,621,195 discloses that titanium ortho esters of the formula $Ti(OR)_4$ wherein R is an organic radical can be reacted with a carboxylic acid and with a regulated amount of water to form organo-polytitanyl acylates. The present invention is directed to the reaction of the above-mentioned titanium ortho esters with anhydrides of monocarboxylic and dicarboxylic acids. It is also directed to the reaction of polymeric titanium esters with these anhydrides of mono- and di-carboxylic acids. The polymerized titanium esters useful as reactants are characterized by a polymeric chain formed by repeating $$-\underset{|}{\overset{|}{Ti}}O-$$

groups with the remaining valances satisfied by radicals such as alkoxy, cycloalkoxy, aroxy, alkaroxy, aralkoxy, and alkenoxy.

It is among the objects of this invention to provide novel methods for the preparation of polymeric titanium esters wherein the titanium ester may be easily recovered from the reaction by-products. A further object is to provide an economical and commercially adaptable method for the preparation of polymeric esters which possess unique solubility characteristics in organic, especially hydrocarbon, solvents, to provide solutions exhibiting novel surface-active effects and adaptable for a wide variety of commercial uses. A still further object is to provide new polymeric titanium ester-acylates and novel methods for effecting their preparation. Further objects and advantages will appear hereinafter.

These objects are accomplished by commingling and reacting an organo-titanium ester with an organic acid anhydride.

In a more specific and preferred embodiment, the invention comprises heating an alkyl ortho-titanate, such as tetraisopropyl titanate, with from 1–3 mols of a monocarboxylic or dicarboxylic acid anhydride per mol of ortho-titanate.

For a better understanding of my invention, the following equations are presented to explain the apparent mechanism of the process. Although these equations are believed to be correct explanations of the reactions involved, it should at the same time be understood that the operability of the invention is not necessarily dependent on any theoretical explanation of how my results are accomplished. Starting first with one mol of a titanium ortho ester of the formula $Ti(OR)_4$ (wherein R is an organic radical, such as alkyl, cycloalkyl, aryl, alkaryl, aralkyl, and alkylene) and reacting this ester with one mol of an acid anhydride of the type represented by such anhydrides as acetic, propionic, caproic or benzoic anhydride, the reaction proceeds as follows:

EQUATION 1

$$RO-\underset{\underset{R}{\overset{|}{O}}}{\overset{\overset{R}{\overset{|}{O}}}{Ti}}-OR + \underset{R'C\overset{\|}{\underset{O}{\nearrow}}}{\overset{R'\overset{\|}{\overset{O}{C}}}{\searrow}}O \longrightarrow R'\overset{O}{\overset{\|}{C}}O-\underset{\underset{R}{\overset{|}{O}}}{\overset{\overset{R}{\overset{|}{O}}}{Ti}}-OR + R'\overset{O}{\overset{\|}{C}}-OR$$

The above reaction may then be followed by a second reaction which splits a mol or organic ester from the newly formed titanium ester acylate, thus producing a polytitanyl structure.

EQUATION 2

$$x\left(R'\overset{O}{\overset{\|}{C}}O-\underset{\underset{R}{\overset{|}{O}}}{\overset{\overset{R}{\overset{|}{O}}}{Ti}}-OR\right) \longrightarrow \left[-\underset{\underset{R}{\overset{|}{O}}}{\overset{\overset{R}{\overset{|}{O}}}{Ti}}O-\right]_x + xR'\overset{O}{\overset{\|}{C}}OR$$

Thus, the over-all reaction for Equations 1 and 2 may be represented as follows:

EQUATION 3

$$xTi(OR)_4 + x(R'CO)_2O \xrightarrow{\Delta} \left[-\underset{\underset{R}{\overset{|}{O}}}{\overset{\overset{R}{\overset{|}{O}}}{Ti}}O-\right]_x + 2xR'\overset{O}{\overset{\|}{C}}-OR$$

When more than 1 mol of acid anhydride per mol of titanium ester is reacted, the acrylate groups $$\left(R'\overset{O}{\overset{\|}{C}}O-\right)$$

of the anhydride replace OR— groups on the titanyl nucleus. For example, when 2 mols of anhydride are reacted with a mol of ester, the reactions are as follows:

EQUATION 4

$$RO-\underset{\underset{R}{\overset{|}{O}}}{\overset{\overset{R}{\overset{|}{O}}}{Ti}}-OR + 2\underset{R'C\overset{\|}{\underset{O}{\nearrow}}}{\overset{R'\overset{\|}{\overset{O}{C}}}{\searrow}}O \longrightarrow R'\overset{O}{\overset{\|}{C}}-O-\underset{\underset{R}{\overset{|}{O}}}{\overset{\overset{\overset{R'}{\overset{|}{C}}=O}{\overset{|}{O}}}{Ti}}-OR + 2R'\overset{O}{\overset{\|}{C}}OR$$

EQUATION 5

$$x\left(R'\overset{O}{\overset{\|}{C}}-O-\underset{\underset{R}{\overset{|}{O}}}{\overset{\overset{R'}{\overset{|}{C}=O}}{\overset{|}{O}}}{Ti}-OR\right) \xrightarrow{\Delta} \left[-\underset{\underset{R}{\overset{|}{O}}}{\overset{\overset{R'\overset{|}{C}O}{\overset{|}{O}}}{Ti}}O-\right]_x + x R'\overset{O}{\overset{\|}{C}}OR$$

The over-all reaction of Equations 4 and 5 is as follows:

EQUATION 6

$$xTi(OR)_4 + 2x(R'CO)_2O \xrightarrow{\Delta} \left[-\underset{\underset{OR}{\overset{|}{O}}}{\overset{\overset{R_1}{\overset{|}{C}=O}}{\overset{|}{O}}}{Ti}O-\right]_x + 3xR'-\overset{O}{\overset{\|}{C}}-OR$$

The number of acylate groups in the polytitanyl structure for a particular reaction will, of course, depend upon the amount of anhydride reacted. As much as 3 mols of anhydride can be reacted with one mol of titanium ester to replace all of the —OR— groups attached to titanium.

The reaction of titanium esters with cyclic anhydrides, e.g., phthalic anhydride or succinic anhydride, is also part of this invention. These reactions proceed as follows:

EQUATION 7

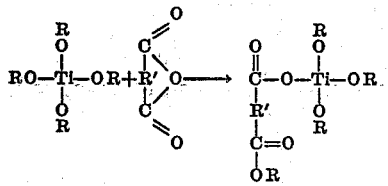

EQUATION 8

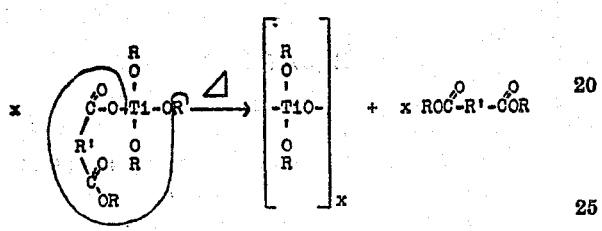

The over-all reaction of Equations 7 and 8 is as follows:

EQUATION 9

$$xTi(OR)_4 + xO=C-R'-C=O \xrightarrow{\Delta} \left[ -TiO- \begin{array}{c} O \\ | \\ O \\ | \\ R \end{array} \right]_x + xRO-\overset{O}{\overset{\|}{C}}-R'=\overset{O}{\overset{\|}{C}}-OR$$

When more than one mol of anhydride per mol of titanium ester is used, the ester-acylate radical $$(RO\overset{O}{\overset{\|}{C}}-R'-\overset{O}{\overset{\|}{C}}O-)$$

derived from the anhydride replaces OR— groups on the titanyl nucleus in much the same manner as the acylate groups do in Equations 4 and 5. The reaction between two mols of cyclic anhydride for each mol of titanium ester is as follows:

EQUATION 10

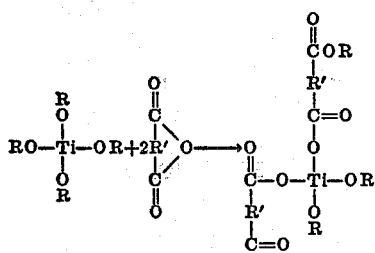

EQUATION 11

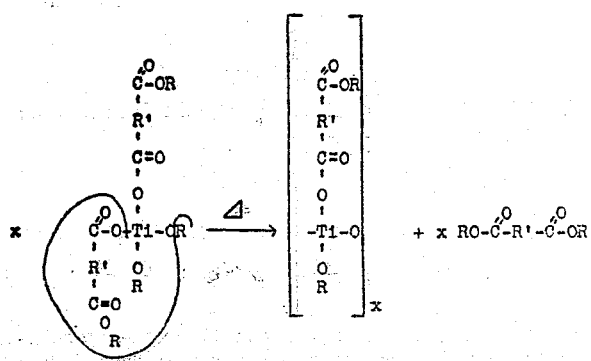

The over-all reaction for Equations 10 and 11 is as follows:

EQUATION 12

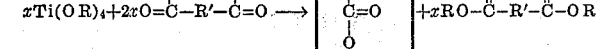
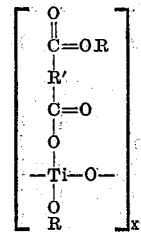

The polymeric titanium ester-acylates represented in Equation 11 by the polymer unit

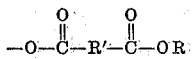

are new and useful products. The group $$-O-\overset{O}{\overset{\|}{C}}-R'-\overset{O}{\overset{\|}{C}}-OR$$

is an ester-acylate group derived from the mono ester of a dicarboxylic acid, with the —OR radical on this unit corresponding to those on the titanium ester used as the starting reactant. The

units, of course, repeat themselves to form linear, branched and cyclic structure and combinations of the same. It should also be pointed out that the polymers do not necessarily average one —OR group and one ester-acylate group per

nucleus. The average of —OR groups and ester-acylate groups per

nucleus depends upon the reacting proportions, and there may be from about 0.05 to 2 ester-acylate groups and up to 1.95 —OR groups per

unit.

It is also part of this invention to hydrolyze the ester-acylate polymers so that the residual —OR groups connected to the titanium atoms are replaced by hydroxyl groups. This may be accomplished by shaking a solution of the polymer, e.g., a cyclohexane solution, with an equivalent amount of water for approximately thirty minutes; after this the mixture is allowed to stand, and the separated layer of cyclohexane solution is recovered. Stripping of the solvent yields the hydrolyzed polymers. The hydrolyzed esters are useful as surface active agents in dispersing pigments in paints, inks, and plastics, and as adhesion promoters for dissimilar materials. Polymerizable products may also be produced.

The reactions of this invention have been illustrated above in terms of the ortho esters of titanium. However, it has also been pointed out that polymeric titanium esters will react with the acid anhydrides. The end products when using the polymerized ester are of the same type as when the ortho esters are used, but since the starting esters are already polymerized, the polymerization reactions shown in Equations 2, 5, 8 and 11 do not occur.

The reaction is a simple replacement of the —OR groups on the ester with acylate or ester-acylate groups depending upon whether the reacted anhydride is formed from mono- or di-carboxylic acids.

The titanium esters and organic acid anhydrides react readily, frequently with the evolution of heat on simple mixing. Thus, the reactions represented in Equations 1, 4, 7, and 10 require merely the mixing of the titanium ester and the organic acid anhydrides. In practice, however, it is usual to heat the resulting reaction mixture, to drive off the by-product ester and to result in the formation of the polymeric titanium derivative. This step corresponds to the reaction set forth in Equations 2, 5, 8 and 11, and is the preferred aspect of the invention resulting in the over-all reactions set forth in Equations 3, 6, 9 and 12 above. Heating at 100° C. for about one hour is usually sufficient to drive the reaction to completion. However, it is possible to use higher temperatures and shorter heating periods or lower temperatures and longer heating periods to accomplish this result.

It is pointed out that the invention has the advantage of producing only one co-product. Furthermore, the alkoxy polytitanyl ester-acylates, produced according to Equation 12, are of such a nature that it is difficult to obtain them in any other way.

The following examples are presented for purposes of illustration of this invention, but they are not to be construed as being in limitation thereof unless otherwise specified. All parts are by weight.

Example I 100 parts of succinic anhydride (1 mol) was agitated with 284 parts of tetra-isopropyl titanate (1 mol) for one hour. On standing, crystals separated. These were purified by recrystallization from hexane and found to melt sharply at 102.5° C. The compound prepared was $Ti(OPr)_3(O_2CC_2H_4CO_2Pr)$ and it hydrolyzed slightly during isolation. Two separate analyses gave the following results: Percent C 45.86; 45.58—percent H 6.78; 7.00—percent $TiO_2$ 21.71; 21.91.

Example II 196 parts of maleic anhydride (2 mols) was melted, and 284 parts (1 mol) of tetra-isopropyl titanate was added slowly with agitation, and the temperature maintained above 60° C. for one hour. After cooling, 400 ml. of cyclohexane was added to produce a clear solution. On evaporation, needlelike crystals formed. These were recovered and the analysis checked closely with the calculated analysis for

[—Ti(OPr)(O₂CCH=CHCO₂Pr)O—]ₓ

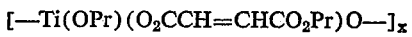

This compound was found to co-polymerize with styrene, with acrylonitrile and with methyl methacrylate.

Example III

Example II was repeated except that no cyclohexane was added, the purification being carried out by vacuum distillation to remove the di-isopropylmaleate from the product. The resulting product was the same as that in Example II.

Example IV 276 parts (1 mol) of tetra-allyl titanate was heated with 296 parts (2 mols) of phthalic anhydride for one hour at a temperature above 60° C. The resulting product was a mixture of equimolecular parts of diallyl phthalate and alloxy-polytitanyl-monoallyl phthalate.

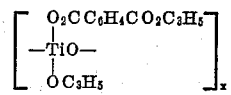

This material was polymerizable by heating with benzoyl peroxide at 110° C. It was also effective as an adhesion promoter between glass fibers and diallyl phthalate resin.

Example V

One mol of tetra-allyl titanate (276 parts) was reacted with 2 mols of maleic anhydride (196 parts) in a manner similar to that shown in Example IV. The product was a mixture of diallyl maleate and alloxy-polytitanyl-monoallyl maleate. The latter had properties similar to those of the compound obtained in Examples II and III.

Example VI

In a manner similar to that shown in Example III, one mol of tetra-isopropyl titanate (286 parts) was reacted with two mols (304 parts) of 4-cyclohexene-1,2-dicarboxylic acid anhydride. The resulting product effectively improved adhesion between glass fibers and diallyl phthalate resin.

Example VII

Two mols (204 parts) of acetic anhydride was added slowly with agitation to 2 mols (568 parts) of tetra-isopropyl titanate. A very rapid reaction took place with the evolution of considerable heat. When the initial reaction had subsided, further heat was applied and about 3.9 mols of isopropyl acetate was removed by distillation at atmospheric pressure. Vacuum was then applied and heating continued to remove the remaining isopropyl acetate. The residue was di-isopropyl-polytitanate. This compound has been previously prepared, but the known methods of preparation involve either the controlled hydrolysis of the monomeric isopropyl titanate or the reaction of acetic acid with tetra-isopropyl titanate. In the first of these processes, extremely careful control is necessary to avoid hydrolysis of some of the remaining isopropyl groups and in the second process, a mixture of co-products is formed, i.e., isopropanol and isopropyl acetate. In contrast, the process shown in this example is a smoothly operating, straight forward process with one co-product which is low boiling and readily removed from the principal product of the reaction.

Example VIII

Example VII was repeated except that 680 parts (2 mols) of tetra-butyl titanate was used in place of the tetra-isopropyl titanate. Four mols of butyl acetate was readily recovered from the reaction mixture leaving relatively pure di-butyl polytitanate as the principal product of the reaction. This is an attractive synthesis for di-butyl polytitanate from both economic and operational viewpoints. It has the advantage over the previously known acetic acid method in that it produces only one by-product (butyl acetate) rather than two in the case of the acetic acid process (butanol and butyl acetate) which require fractional distillation for separation.

Example IX

One mol (210 parts) of dibutylpolytitanate produced as described in Example VIII was mixed with one mol (158 parts) of n-butyric anhydride. The mixture became warm and additional heat was applied to hold the mixture at 100° C. for 30 minutes.

Approximately one mole of n-butyl-n-butyrate was removed by distillation at reduced pressure. The residue analyzed very closely for n-butoxy polytitanyl n-butyrate.

A large number of titanate esters may be used as reactants in this invention. The purchased materials are organic esters corresponding to the general formula $Ti(OR)_4$ and especially those in which R is an alkyl radical containing from 1–18 carbon atoms. Included among the esters which may be used are tetraethyl titanate, tetraisopropyl titanate, tetrabutyl titanate, tetraamyl titanate, tetraoctyl titanate, tetradodecyl titanate, tetra-2-ethylhexyl titanate, tetracyclohexyl titanate, tetramethylphenyl titanate, tetraphenyl titanate, tetrastearyl titanate and tetraoleyl titanate.

The condensed forms of these esters which result from their reaction with a limited amount of water or from a reaction typified in Equation 3 are also contemplated. This water includes that which may find its way into the process of preparation. Example IX is explanatory of a reaction in which a condensed ester is used.

It is contemplated that any available anhydride of a simple carboxylic acid may be used. In those situations where the desired product is a polymeric titanium ester and the anhydride appears in the by-product organic ester as shown in Equation 3, it is desirable to use a simple aliphatic acid anhydride such as acetic anhydride. Where the desired compound is an alkoxy polytitanyl acylate as shown in Equation 6, the acid anhydride used will correspond to the acylate radical desired in the polymer. The only known limit in this situation is the availability of the acid anhydride. Acetic, propionic, butyric, valeric, and caproic anhydrides may be mentioned among the aliphatic derivatives and benzoic anhydride is a typical aromatic compound. Where the desired compound is a polytitanyl di-acylate, the same situation with respect to the use of the acid anhydride applies. Of special interest in the reaction shown in Equation 12 are such cyclic anhydrides as succinic anhydride, maleic anhydride, phthalic anhydride, and 4-cyclohexene-1,2-dicarboxylic acid anhydride. However, it is not intended to limit the invention to these specific compounds since all acid anhydrides of a similar character serve the same purpose. Obviously, the free hydrogens attached to the carbon atoms may be replaced by other substituent groups such as halogens or nitro groups and the like. A readily available substituted anhydride of this type is tetrachlorophthalic anhydride.

When use is made of these cyclic anhydrides of dicarboxylic acids the anhydride ring is broken during the reaction, and one carboxylic group attaches itself to the titanium and the other carboxylic group forms an ester with the alkoxy group removed from the titanium. Thus one obtains an ester-acylate in which the organic ester group is removed from the titanium atom by a hydrocarbon chain or an aromatic ring.

The polymeric titanium compounds of this invention are generally organo-soluble oils or low melting waxes and are particularly soluble in petroleum and other hydrocarbon solvents. These resulting hydrocarbon solutions exhibit interesting surface active properties. They improve the fluidity of the dispersion of many solids, particularly carbon black in petroleum solvents. They are useful as anti-sludging agents for lubricating oils, particularly for internal combustion engines. When applied to textiles and hydrolyzed with water or steam, they impart good water repellent properties to the textile. They also function as adhesion promoters.

The polymeric titanium ester-acylates are particularly useful as surface active agents, as metal protective agents and as ingredients of coating composition vehicles. Their utility as adhesion promoters is illustrated by the results obtained in the following test:

Unsized glass fibers were wrapped on creels and thoroughly saturated with a cyclohexane solution containing 2% by weight of the titanium compounds listed below. The creels were then removed and allowed to dry until the solvent was removed. The creels were then immersed in a diallyl phthalate polyester resin and allowed to drain. The impregnated glass fibers were removed from the creel and hung under tension by attaching weights on the end. The fibers were then wrapped with cellophane tape so that a 1/8" O.D. rod was produced. The rods were placed in a clamp and the weights cut off. The clamp and rods were then placed in an oven at 110° C. to effect curing of the resin.

The strength of the rods produced is an indication of the strength of the bond between the glass fibers and the resin. The resistance of the bond to water was determined by immersing the rods in boiling water for 2 hours and comparing the strength with the original. Break tests were made on 3" long samples with a Tinius-Olsen break tester. The results were as follows:

| Adhesion Promotor | Strength, p.s.i. | |
|---|---|---|
| | Original, Dry | After boiling water |
| None (Cyclohexane only) | 110,000 | 60,000 |
| Product from Example IV | 159,000 | 137,000 |
| Product from Example V | 137,000 | 118,000 |
| Product from Example VI | 145,000 | 120,000 |

It may be seen that the titanium compounds not only increased the original bond strength but retained a larger proportion after boiling water immersion.

Many advantages are to be derived from this invention. Particularly advantageous is the simplicity of the method of preparation wherein only one reaction co-product is obtained which is easily separated from the polymeric titanium compound. The preparation of the new polymeric titanium ester-acylates such as alloxy-polytitanyl monoallyl-phthalate and alloxy-polytitanyl monoallyl-maleate is unique, and offers the best if not the only practical route for their manufacture.

The reaction of acetic anhydride with tetrabutyl titanate is the most commercially attractive method for producing dibutyl polytitanate. The only co-product is butyl acetate and this is recovered in purity sufficient for sale without further treatment. Dibutyl polytitanate is used as a component in high temperature paints.

I claim as my invention:

1. A process for the preparation of a polymeric titanium compound which comprises reacting an organic titanium ester selected from the group consisting of organic esters of ortho-titanic acid having the formula Ti(OR)$_4$, in which R is an organic radical selected from the group consisting of alkyl, cycloalkyl, aryl, alkaryl, aralkyl, and alkylene; and polymeric titanium esters having the nucleus of $$-\underset{|}{\overset{|}{\text{Ti}}}\text{O}-$$

in which the remaining valeneces are satisfied by radicals selected from the group consisting of alkoxy, cycloalkoxy, aroxy, alkaroxy, aralkoxy, and alkenoxy with an organic acid anhydride selected from the group consisting of anhydrides of monocarboxylic acids and dicarboxylic acids, said anhydride containing the carboxylic function as the only function reactive with said organic titanium ester.

2. A process for the preparation of a polymeric titanium compound which comprises reacting an organic ester of ortho-titanic acid having the formula Ti(OR)$_4$, in which R is an organic radical selected from the group alkyl, cycloalkyl, aryl, alkaryl, aralkyl, and alkylene with an organic acid anhydride selected from the group consisting of anhydrides of monocarboxylic acids and dicarboxylic acids, said anhydrides containing the carboxylic function as the only function reactive with said organic ester of ortho-titanic acid.

3. A process for the preparation of a polymeric titanium compound which comprises reacting an organic ester of ortho-titanic acid having the formula Ti(OR)$_4$, in which R is an organic radical selected from the group consisting of alkyl, cycloalkyl, aryl, alkaryl, aralkyl, and alkylene, with an acid anhydride selected from the group of anhydrides of monocarboxylic acids, said anhydrides containing the carboxylic function as the only function reactive with said organic ester of ortho-titanic acid and dicarboxylic acids, the ratio of acid anhydride to titanium ester being 1 to 3 mols of anhydride per mol of ester.

4. A process for the preparation of a polymeric titanium compound which comprises heating together an organic ester of ortho-titanic acid having the formula Ti(OR)$_4$, in which R is an organic radical selected from the group consisting of alkyl, cycloalkyl, aryl, alkaryl, aralkyl, and alkylene, and an acid anhydride selected from the group of anhydrides of monocarboxylic acids, said anhydrides containing the carboxylic function as the only function reactive with said organic ester of ortho-titanic acid and dicarboxylic acids, the ratio of the acid anhydride to titanium ester being 1 to 3 mols of anhydride per mol of ester, removing by-product ester by continuing said heating, and thereafter recovering the polymeric titanium ester formed.

5. The process of claim 4 in which the organic ester is tetra-isopropyl titanate and the anhydride is maleic anhydride.

6. The process of claim 4 in which the organic ester is tetra-allyl titanate and the anhydride is phthalic anhydride.

7. The process of claim 4 in which the organic ester is tetra-allyl titanate and the anhydride is maleic anhydride.

8. The process of claim 4 in which the organic ester is tetra-isopropyl titanate and the anhydride is 4-cyclohexene-1,2-dicarboxylic acid anhydride.

9. The process of claim 4 in which the organic ester is tetra-isopropyl titanate and the anhydride is acetic anhydride.

10. The process for the preparation of a polymeric titanium compound which comprises heating together an organic ester of ortho-titanic acid having the formula Ti(OR)$_4$, in which R is an organic radical selected from the group alkyl, cycloalkyl, aryl, alkaryl, aralkyl, and alkylene, and at least 2 mols of an anhydride of a dicarboxylic acid per mol of ester, said anhydride containing the carboxylic function as the only function reactive with said organic ester of ortho-titanic acid, hydrolyzing the ester-acylate polymers obtained therefrom, and recovering the hydrolyzed polymers.

11. As a new polymeric titanium compound the compound containing repeating

groups having the following chemical groups connected to the titanium atom: 0.05 to 2 ester-acylate groups per titanium atom, said ester-acylate groups being connected to the titanium atom only through the acylate group and derived from the group consisting of mono-alkyl, mono-cycloalkyl, mono-aryl, mono-alkaryl, mono-arakyl, and mono-alkylene ester of a dicarboxylic acid, and the remainder being oxy radicals selected from the group consisting of hydroxy, alkoxy, cycloalkoxy, aroxy, alkaroxy, aralkoxy, and alkenoxy.

12. The compound as in claim 11 in which the ester-acylate group is mono-isopropyl maleate and the oxy radical is isopropoxy.

13. The compound as in claim 11 in which the ester-acylate group is mono-allyl phthalate and the oxy radical is alloxy.

14. The compound as in claim 11 in which the ester-acylate group is mono-allyl maleate and the oxy radical is alloxy.

15. The compound of claim 11 in which the ester-acylate group is the mono-isopropyl ester of 4-cyclohexene-1,2-dicarboxylate and the oxy radical is isopropoxy.

References Cited in the file of this patent

UNITED STATES PATENTS

| | | |
|---|---|---|
| 2,621,193 | Langkammerer | Dec. 9, 1952 |
| 2,630,443 | Boyd | Mar. 3, 1953 |
| 2,850,512 | Beacham et al. | Sept. 2, 1958 |